(12) United States Patent
Gaur et al.

(10) Patent No.: US 11,079,911 B2
(45) Date of Patent: Aug. 3, 2021

(54) ENROLLMENT-FREE OFFLINE DEVICE PERSONALIZATION

(71) Applicant: Synaptics Incorporated, San Jose, CA (US)

(72) Inventors: Utkarsh Gaur, Millbrae, CA (US); Gaurav Arora, Cupertino, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 16/553,998

(22) Filed: Aug. 28, 2019

(65) Prior Publication Data

US 2020/0210035 A1 Jul. 2, 2020

Related U.S. Application Data

(60) Provisional application No. 62/785,179, filed on Dec. 26, 2018.

(51) Int. Cl.
*G06F 16/56* (2019.01)
*G06F 3/0484* (2013.01)
(Continued)

(52) U.S. Cl.
CPC ............ *G06F 3/0484* (2013.01); *G06F 9/451* (2018.02); *G06F 16/2282* (2019.01);
(Continued)

(58) Field of Classification Search
CPC ........ G06F 3/0484; G06F 9/451; G06F 16/56; G06F 16/5854; G06F 16/2282; G06F 16/2457; G06K 9/00268; G06N 3/08
See application file for complete search history.

(56) References Cited

U.S. PATENT DOCUMENTS 6,160,903 A * 12/2000 Hamid ................ G07C 9/37
382/115
7,734,067 B2 * 6/2010 Kim ..................... G06K 9/6255
235/380
(Continued)

FOREIGN PATENT DOCUMENTS

EP         3367297 A1    8/2018
KR   10-2016-0012031 A  2/2016

OTHER PUBLICATIONS

Mohammad Haghighat et al., "Fully automatic face normalization and single sample face recognition in unconstrained environments ," 2016, Elsevier Ltd., Expert Systems with Applications 47, pp. 23-34. (Year: 2016).*

(Continued)

*Primary Examiner* — Dino Kujundzic
(74) *Attorney, Agent, or Firm* — Paradice & Li LLP

(57) ABSTRACT

A method and apparatus for device personalization. A device is configured to receive first sensor data from one or more sensors, detect biometric information in the first sensor data, encode the biometric information as a first vector using one or more neural network models stored on the device, and configure a user interface of the device based at least in part on the first vector. For example, the profile information may include configurations, settings, preferences, or content to be displayed or rendered via the user interface. In some implementations, the first sensor data may comprise an image of a scene and the biometric information may comprise one or more facial features of a user in the scene.

14 Claims, 7 Drawing Sheets

(51) Int. Cl.
*G06F 9/451* (2018.01)
*G06F 16/22* (2019.01)
*G06K 9/00* (2006.01)
*G06F 16/583* (2019.01)
*G06N 3/08* (2006.01)
*G06F 16/2457* (2019.01)

(52) U.S. Cl.
CPC .......... *G06F 16/2457* (2019.01); *G06F 16/56* (2019.01); *G06F 16/5854* (2019.01); *G06K 9/00268* (2013.01); *G06N 3/08* (2013.01)

(56) References Cited

U.S. PATENT DOCUMENTS

| | | | | |
|---|---|---|---|---|
| 9,082,235 | B2* | 7/2015 | Lau | G06K 9/00281 |
| 9,286,482 | B1* | 3/2016 | Dumont | G06F 21/32 |
| 10,402,553 | B1* | 9/2019 | Johnson | G06K 9/00261 |
| 10,748,037 | B2* | 8/2020 | Behringer | G06N 20/00 |
| 2007/0140532 | A1* | 6/2007 | Goffin | H04N 7/14 |
| | | | | 382/118 |
| 2011/0173662 | A1* | 7/2011 | Beppu | H04N 21/44218 |
| | | | | 725/46 |
| 2013/0160141 | A1* | 6/2013 | Tseng | G06F 21/31 |
| | | | | 726/28 |
| 2015/0092996 | A1* | 4/2015 | Tian | G06K 9/00926 |
| | | | | 382/118 |
| 2015/0139492 | A1* | 5/2015 | Murakami | G06K 9/3241 |
| | | | | 382/103 |
| 2016/0026342 | A1 | 1/2016 | Cohen et al. | |
| 2017/0053108 | A1* | 2/2017 | Jakobsson | H04L 63/10 |
| 2018/0199114 | A1 | 7/2018 | Ferren et al. | |
| 2018/0330179 | A1 | 11/2018 | Streit | |
| 2019/0042835 | A1* | 2/2019 | Mostafa | G06K 9/00288 |
| 2019/0080066 | A1* | 3/2019 | Van Os | G06F 21/32 |
| 2019/0114060 | A1* | 4/2019 | Resudek | G06F 21/32 |

OTHER PUBLICATIONS

International Search Report and Written Opinion dated Apr. 13, 2020, issued in International Application No. PCT/US2019/067086, filed Dec. 18, 2019, 9 pages.

* cited by examiner

ENROLLMENT-FREE OFFLINE DEVICE PERSONALIZATION

CROSS-REFERENCE TO RELATED APPLICATION

This application claims priority and benefit under 35 USC § 119(e) to U.S. Provisional Patent Application No. 62/785,179, filed on Dec. 26, 2018, which is incorporated herein by reference in its entirety.

TECHNICAL FIELD

The present embodiments relate generally to device personalization.

BACKGROUND OF RELATED ART

Some electronic devices may be capable of providing a personalized user experience. For example, a smart television (TV) may display a list of recommendations for movies, music, shows, or other content based on a user's preferences and/or viewing habits. The smart TV may determine which recommendations to display based on user input. For example, a husband and wife may set up respective user profiles on the smart TV. The smart TV may then display a customized list of recommendations for each user profile. For example, if the husband's user profile indicates a preference for comedies, the smart TV may display a list of comedies when the husband's user profile is selected. On the other hand, if the wife's user profile indicates a preference for action movies, the smart TV may display a list of action movies when the wife's user profile is selected.

SUMMARY

This Summary is provided to introduce in a simplified form a selection of concepts that are further described below in the Detailed Description. This Summary is not intended to identify key features or essential features of the claims subject matter, nor is it intended to limit the scope of the claimed subject matter.

A method and apparatus for device personalization is disclosed. One innovative aspect of the subject matter of this disclosure can be implemented in a method of operating a device. In some embodiments, the method may include steps of receiving first sensor data from one or more sensors, detecting biometric information in the first sensor data, encoding the biometric information as a first vector using one or more neural network models stored on the device, and configuring a user interface of the device based at least in part on the first vector.

Another innovative aspect of the subject matter of this disclosure can be implemented in a system comprising a memory, one or more sensors, a vector generator, and a display. The memory stores one or more neural network models. The sensors are configured to capture sensor data. The vector generator is configured to detect biometric information in the captured sensor data and encode the biometric information as a vector using the one or more neural network models stored in memory. The display is configured to display a personalized user interface based at least in part on the encoded vector.

BRIEF DESCRIPTION OF THE DRAWINGS

The present embodiments are illustrated by way of example and are not intended to be limited by the figures of the accompanying drawings.

DETAILED DESCRIPTION

Figure 1:
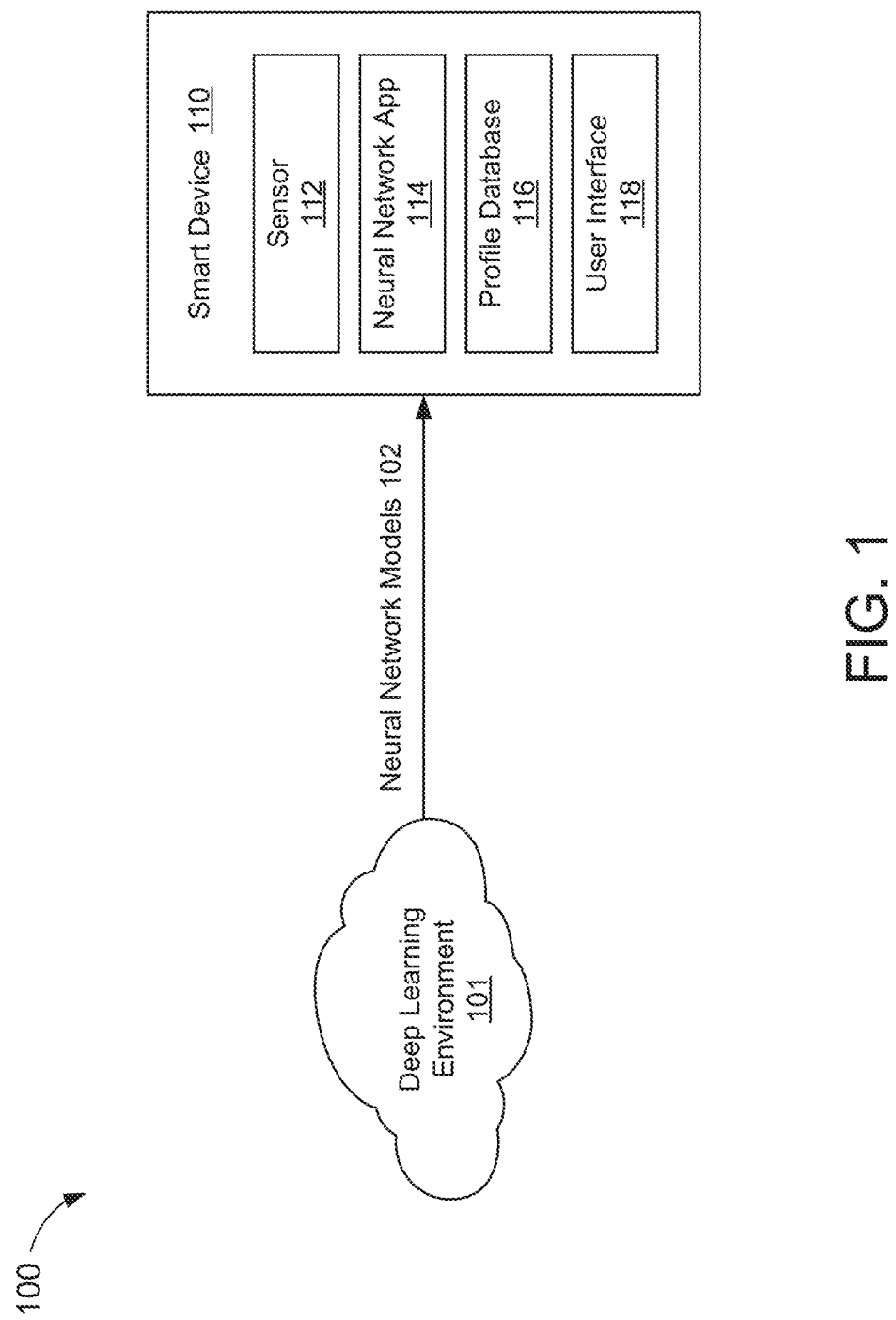
FIG. 1 shows a block diagram of a machine learning system, in accordance with some embodiments.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory. The interconnection between circuit elements or software blocks may be shown as buses or as single signal lines. Each of the buses may alternatively be a single signal line, and each of the single signal lines may alternatively be buses, and a single line or bus may represent any one or more myriad physical or logical mechanisms for communication between components.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory computer-readable storage medium comprising instructions that, when executed, performs one or more of the methods described above. The non-transitory computer-readable storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors. The term "processor," as used herein, may refer to any general-purpose processor, conventional processor, controller, microcontroller, special-purpose processor, and/or state machine capable of executing scripts or instructions of one or more software programs stored in memory. The term "smart device," as used herein, may refer to any device capable of providing a personalized user experience. Examples of smart devices may include, but are not limited to, personal computing devices (e.g., desktop computers, laptop computers, netbook computers, tablets, web browsers, e-book readers, and personal digital assistants (PDAs)), data input devices (e.g., remote controls and mice), data output devices (e.g., display screens and printers), remote terminals, kiosks, video game machines (e.g., video game consoles, portable gaming devices, and the like), communication devices (e.g., cellular phones such as smart phones), media devices (e.g., recorders, editors, and players such as televisions, set-top boxes, music players, digital photo frames, and digital cameras), and the like.

FIG. 1 shows a block diagram of a machine learning system 100, in accordance with some embodiments. The system 100 includes a deep learning environment 101 and a smart device 110. The deep learning environment 101 may include memory and/or processing resources to generate or train one or more neural network models 102. In some embodiments, the neural network models 102 may be implemented on the smart device 110. For example, the smart device 110 may use the neural network models 102 to recognize a user by his or her biometric signatures. Example biometric signatures include, but are not limited to, a user's face, voice, fingerprint, eyes, or any other uniquely identifiable biological characteristics of the user.

The deep learning environment 101 may be configured to generate one or more neural network models 102 through deep learning. Deep learning is a particular form of machine learning in which the training phase is performed over multiple layers, generating a more abstract set of rules in each successive layer. Deep learning architectures are often referred to as artificial neural networks due to the way in which information is processed (e.g., similar to a biological nervous system). For example, each layer of the deep learning architecture may be composed of a number of artificial neurons. The neurons may be interconnected across the various layers so that input data (e.g., the raw data) may be passed from one layer to another. More specifically, each layer of neurons may perform a different type of transformation on the input data that will ultimately result in a desired output (e.g., the answer). The interconnected framework of neurons may be referred to as a neural network model. Thus, the neural network models 102 may include a set of rules that can be used to describe a particular object or feature such as, for example, a human face.

The deep learning environment 101 may have access to a large volume of raw data and may be trained to recognize a set of rules (e.g., certain objects, features, a quality of service, such as a quality of a received signal or pixel data, and/or other detectable attributes) associated with the raw data. For example, in some aspects, the deep learning environment 101 may be trained to recognize human faces. During the training phase, the deep learning environment 101 may process or analyze a large number of images and/or videos that contain human faces. The deep learning environment 101 may also receive an indication that the provided media contains a human face (e.g., in the form of user input from a user or operator reviewing the media and/or data or metadata provided with the media). The deep learning environment 101 may then perform statistical analysis on the images and/or videos to determine a common set of features associated with human faces. In some aspects, the determined features (or rules) may form an artificial neural network spanning multiple layers of abstraction. The deep learning environment 101 may then provide the set of rules, as the neural network models 102, to the smart device 110 for inferencing.

In some aspects, one or more of the neural network models 102 may be provided to (and stored on) the smart device 110 at a device manufacturing stage. For example, the smart device 110 may be pre-loaded with the neural network models 102 prior to being shipped to an end user. In some other aspects, the smart device 110 may receive one or more of the neural network models 102 from the deep learning environment 101 at runtime. For example, the deep learning environment 101 may be communicatively coupled to the smart device 110 via a network (e.g., the cloud). Accordingly, the smart device 110 may receive the neural network models 102 (including updated neural network models) from the deep learning environment 101, over the network, at any time.

The smart device 110 may be any device capable of providing a customizable user experience, such as a personalized user interface, based on the preferences, activity, or habits of a given user. Example smart devices may include, but are not limited to, set-top boxes (STBs), computers, mobile phones, tablets, televisions (TVs) and the like. The smart device 110 may include a sensor 112, a neural network application 114, a profile database 116, and a user interface 118. The sensor 112 may be configured to collect data (e.g., images, video, audio recordings, and the like) that can be used to detect and/or identify biometric information of the user. Example suitable sensors include, but are not limited to: cameras, capacitive sensors, voice recognition systems, and the like.

The neural network application 114 may be configured to generate one or more inferences about the sensor data captured by the sensor 112. For example, in some aspects, the neural network application 114 may analyze the sensor data to infer or identify objects of interest contained therein. Example objects of interest may include, but are not limited to, faces, logos, destinations, and the like. In some embodiments, the neural network application 114 may generate the inferences based on the neural network models 102 provided by the deep learning environment 101. For example, during the inferencing phase, the neural network application 114 may apply the neural network models 102 to new sensor data (e.g., images or videos) captured by the sensor 112, by traversing the artificial neurons in the artificial neural network, to infer information about the data.

Aspects of the present disclosure recognize that it may be undesirable to send certain user data to the deep learning environment 101 (or outside the smart device 110), for example, to further refine the neural network models 102 and/or generate additional neural network models based on the user's biometric signatures. Thus, in some embodiments, the neural network application 114 may operate in an offline manner (e.g., without sending any sensor data or biometric information outside the smart device 110). By performing inferencing on the sensor data locally, on the smart device 110 itself, the embodiments described herein may perform machine learning more efficiently, in a manner that also protects user privacy.

The profile database 116 may store profile information for one or more users of the smart device 110. The profile information may include configurations, settings, preferences, and/or content that can be used to personalize the smart device 110 for a particular user. In some embodiments, the profile database 116 may be empty when the smart device 110 is initialized (e.g., powered on or started for the first time), and may grow as new users interact with the smart device 110. In other words, the smart device 110 may dynamically update the profile information in the profile database 116 as it learns the preferences and/or habits of its users.

In some aspects, the smart device 110 may store or record the user's prior device settings and/or configurations as the profile information for that user. For example, the smart device 110 may monitor a user's personalization settings each time the user operates or interacts with the smart device 110. Example personalization settings may include, but are not limited to, display brightness, volume level, and contrast ratio. The smart device 110 may then store the user's personalization settings with the profile information for that user in the profile database 116. In some other aspects, the smart device 110 may infer profile information about the user based, at least in part, on the user's prior activity, demographic information, and/or user inputs. For example, the smart device 110 may monitor a user's viewing habits to infer that the particular user enjoys romantic comedies. The smart device 110 may then store the user's preference for romantic comedies with the profile information for that user in the profile database 116.

The user interface 118 may provide an interface through which the user can operate or otherwise use the smart device 110. In some aspects, the user interface 118 may display, render, or otherwise manifest the profile information on the smart device 110 to provide a personalized user experience. For example, the user interface 118 may dynamically adjust the display brightness, volume level, contrast ratio, and/or other configurations of the smart device 110 based on the user's personalization settings. The user interface 118 may also display movie recommendations based on a user's preference for a particular movie or genre of movies (e.g., comedy).

In some embodiments, the smart device 110 may determine which user's profile information to be implemented by the user interface 118 based at least in part on information determined about user by the neural network application 114. For example, the smart device 110 may match the inferences about the user from the neural network application 114 with the inferences about the user's preferences from the profile database 116. Accordingly, the smart device 110 may dynamically update the user interface 118 to provide a personalized user experience for the user of the smart device 110 at any given time.

Aspects of the present disclosure may provide a personalized user experience without requiring a user to enroll his or her biometric signature or register a user profile. For example, the present embodiments may not require any form of explicit or deliberate action by the user (such as providing a biometric input multiple times during a dedicated enrollment phase) to set up a user profile. Thus, the user may be able to use the smart device 110 in the manner in which it was intended (e.g., viewing or listening to media content, making phone calls, sending or receiving messages, and the like) at all times.

In some embodiments, the smart device 110 may acquire biometric data in a manner that is transparent to the user. For example, the smart device 110 may operate the sensor 112 to capture sensor data while the user is operating the smart device 110 for its intended use (e.g., viewing or listening to media content, making phone calls, sending or receiving messages, and the like). The smart device 110 may further operate the neural network application 114 to generate a unique biometric identifier based on the captured sensor data. For example, the neural network application 114 may generate the same (or substantially similar) biometric identifier for each frame of sensor data containing biometric information for a particular user. Moreover, the biometric identifier(s) for a particular user should be substantially different, or uniquely identifiable, from the biometric identifiers for other users. In some embodiments, the biometric identifier may not reveal the identity of the user or any personal information (e.g., name, location, and the like) about the user.

The smart device 110 may then match the biometric identifier to profile information stored in the profile database 116. In some embodiments, the profile database 116 may store known biometric identifiers in association with profile information for the corresponding users. In some embodiments, neither the biometric identifiers nor the profile information may reveal any personal information about the user. The smart device 110 may then implement the profile information on the user interface 118 to provide a personalized user experience for the current user of the smart device 110. Because no user input is required and no personal information is communicated outside the smart device 110, the smart device 110 may personalize the user interface 118 for a particular user in a manner that is transparent to the user while also preserving the user's privacy.

Figure 2:
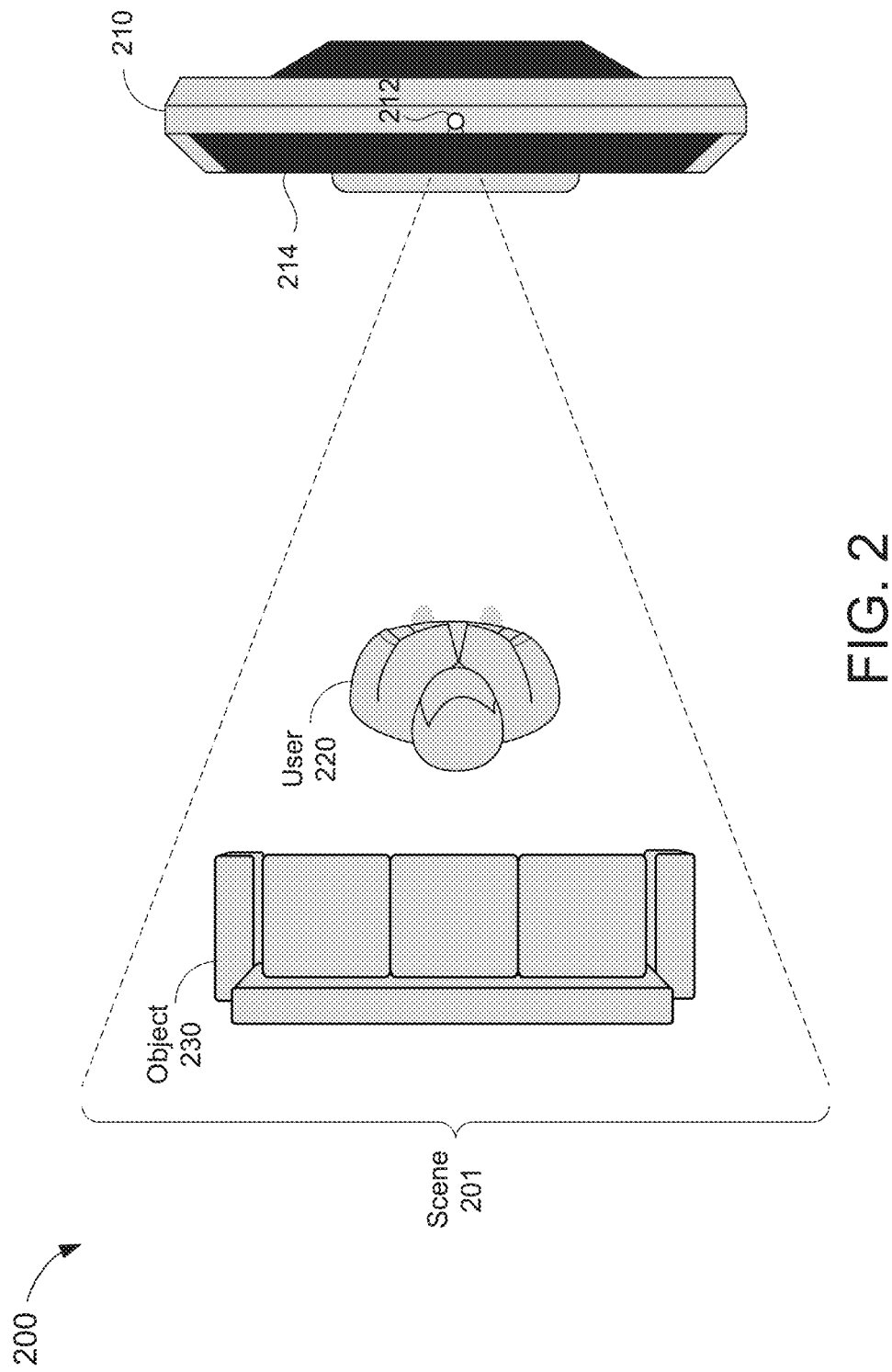
FIG. 2 shows an example environment in which the present embodiments may be implemented.

FIG. 2 shows an example environment 200 in which the present embodiments may be implemented. The environment 200 includes a smart device 210, a user 220, and a non-user object 230. The smart device 210 may be one embodiment of the smart device 110 of FIG. 1. In the embodiment of FIG. 2, the smart device 210 is depicted as a media device (e.g., a television) capable of displaying or playing back media content (e.g., image, videos, audio, and the like) to the user 220. The smart device 210 further includes a camera 212 and a display 214.

The camera 212 may be one embodiment of the sensor 112 of FIG. 1. More specifically, the camera 212 may be configured to capture images (e.g., still-frame images and/or video) of a scene 201 in front of the smart device 210. For example, the camera 212 may comprise one or more optical sensors. Example optical sensors may include, but are not limited to, photodiodes, CMOS image sensor arrays, CCD arrays, and/or any other sensors capable of detecting wavelengths of light in the visible spectrum, the infrared spectrum, and/or the ultraviolet spectrum.

The display 214 may be configured to display media content to the user 220. For example, the display 214 may include a screen or panel upon which the media content may be rendered and/or projected. Example suitable display technologies may include, but are not limited to, light emitting diode (LED), organic LED (OLED), cathode ray tube (CRT), liquid crystal display (LCD), electroluminescence (EL), plasma, or other display technologies. In some embodiments, the display 214 may also correspond to and/or provide a user interface (e.g., the user interface 118 of FIG. 1) through which the user 220 may interact with or use the smart device 210.

In some embodiments, the smart device 210 may provide a personalized user experience based, at least in part, on the preferences, activity, or habits of the user 220. For example, the smart device 210 may detect the face of the user 220 in a scene 201 captured by the camera 212. In some aspects, the camera 212 may continuously (or periodically) capture images of the scene 201 without any input by the user 220. Accordingly, the smart device 210 may detect the presence of the user's face in response to the user 220 stepping into the camera's field of view.

Upon detecting a user's face in the image of the scene 201, the smart device 210 may convert the captured image to a biometric identifier, such as a face vector. For example, the smart device 210 may encode the captured image as a multi-dimensional vector that uniquely maps to the face of the user 220. During the encoding process, the smart device 210 may ignore or filter non-user objects (such as the object 230) that may also be present in the image. In other words, the smart device 210 may encode different images containing the same user's face as the same (or substantially similar) face vector regardless of pose, facial position, and/or presence of other objects in the scene 201. In some embodiments, the smart device 210 may generate the face vector using one or more locally-stored neural network models.

The smart device 210 may then match the face vector with associated profile information to present a personalized user interface on the display 214 for the user 220. The profile information may be determined based on the user's viewing history and/or self-reported interests or preferences. Thus, in some embodiments, the smart device 210 may display recommendations for other media content that may be of interest to the user. For example, in some aspects, the profile information may indicate one or more genres of media content (e.g., sports, comedy, action, horror, etc.) that the user 220 prefers. Accordingly, the smart device 210 may display recommendations for other media content belonging to the preferred genres.

In some other aspects, the profile information may indicate a preference for television shows broadcast on a particular television station or network. Accordingly, the smart device 210 may recommend other shows to the user from the same television network or production studio. In some implementations, the owner or creator of the media content may be different than the content delivery network (CDN) that streams or broadcasts the media content to the smart device 210. For example, the content owner may be a broadcast television network or production studio, whereas the CDN may be a streaming video-on-demand (VoD) or pay-per-view (PPV) service. Thus, in some aspects, the smart device 210 may provide the user 220 with an option to view additional content from a preferred content creator or owner, where such additional content is available for streaming by the same CDN that streamed the content from which the user's preference was inferred.

In some other embodiments, the smart device 210 may display advertisements for products that the user may be interested in purchasing. For example, the profile information may indicate that the user 220 has a preference or interest in a particular brand or type of product. Accordingly, the smart device 210 may present targeted advertisements to the user for the particular brand or type of product and/or related brands or products. In some aspects, the targeted advertisements may include an option to purchase the identified products via the smart device 210.

In some embodiments, where multiple face vectors are extracted from an image of the scene 201, the smart device 210 may display recommendations for only one of the detected face vectors. In some aspects, the smart device 210 may only display recommendations that are suitable for all of the face vectors detected in front of the device 210. For example, if the profile information associated with one of the face vectors indicates a preference for media content which may be inappropriate for younger audiences (e.g., R-rated content) while the profile information for another of the face vectors indicates a preferences for media content appropriate for all ages (e.g., G-rated content), the smart device 210 may display only recommendations for other media content that is appropriate for all ages.

In some other embodiments, the smart device 210 may display recommendations for each of the detected face vectors concurrently. For example, the smart device 210 may display at least some recommendations based on the profile information associated with a first face vector and at least some recommendations based on the profile information associated with a second face vector. Still further, in some embodiments, the smart device 210 may interpret the plurality of face vectors as a single unit or group of users. For example, the smart device 210 may display recommendations based on the common interests of the group. Example recommendations may include game shows, sports, and/or other shows or programming that the combination of face vectors is known to enjoy.

Figure 3:
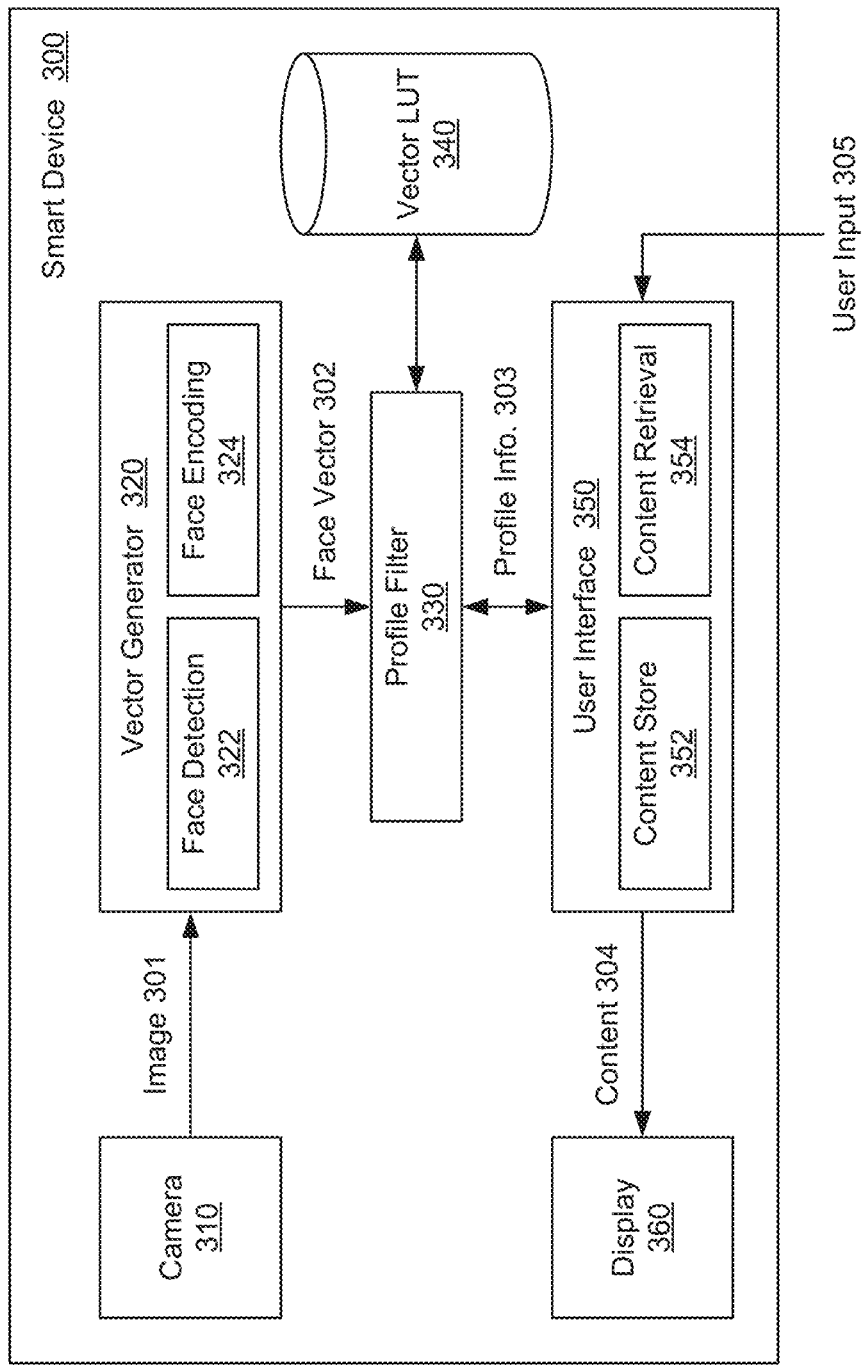
FIG. 3 shows a block diagram of a smart device, in accordance with some embodiments.

FIG. 3 shows a block diagram of a smart device 300, in accordance with some embodiments. The smart device 300 may be one embodiment of the smart device 110 of FIG. 1 and/or smart device 210 of FIG. 2. The smart device 300 includes a camera 310, a vector generator 320, a profile filter 330, a vector lookup table (LUT) 340, a user interface 350, and a display 360.

The camera 310 is configured to capture an image 301 of the environment surrounding the smart device 300 (e.g., the scene 201 of FIG. 2). The camera 310 may be one embodiment of the camera 212 of FIG. 2. Thus, the camera 310 may be configured to capture images (e.g., still-frame images and/or video) of a scene in front of the smart device 300.

The display 360 is configured to display media content to a user of the smart device 110. The display 360 may be one embodiment of the display 214 of FIG. 2. Thus, the display 360 may comprise a display screen or panel upon which the media content may be rendered and/or projected. In some embodiments, the display 360 may also provide or present a visual representation of the user interface 350.

The vector generator 320 is configured to encode the image 301 as a face vector 302. The vector generator 320 may be one embodiment of the neural network application 114 of FIG. 1. Thus, the vector generator 320 may generate inferences about the image 301 using one or more neural network models stored on the smart device 300. For example, as described with respect to FIG. 1, the vector generator 320 may receive trained neural network models prior to receiving the image 301 from the camera 310. In some embodiments, the vector generator 320 may include a face detection module 322 and a face encoding module 324. The face detection module 322 may detect faces in the captured image 301. For example, the face detection module 322 may detect the faces using any known face detection algorithms and/or techniques (such as a Haar feature based face detector).

Once a face is detected, the face encoding module 324 may embed (e.g., map or encode) the image 301 into a unique face vector 302. The face encoding module 324 should produce the same (or substantially similar) face vector for each image that contains the same user's face., regardless of pose, face position, or other non-user objects in the image. Further, the face vector for a particular user should be substantially different than the face vectors for any other user. Accordingly, the face vector may be an N-dimensional vector (e.g., where N is the number of dimensions needed to satisfy the requirements of such a uniquely identifiable vector). In some embodiments, the face encoding module 324 may perform the embeddings using a neural network model trained from a large dataset of images containing faces. An example process for training the neural network model is described below, with respect to FIG. 4.

The profile filter 330 is configured to retrieve profile information 303 associated with the face vector 302 generated by the vector generator 320. For example, the profile filter 330 may compare the face vector 302 to known face vectors stored in the vector LUT 340. If no match is detected, the profile filter 330 may store the face vector 302 as a new entry in the vector LUT 340. However, if a match is detected, the profile filter 330 may retrieve the profile information 303 associated with the matching face vector 302. In some embodiments, the profile filter 330 may retrieve the profile information 303 only after the matching face vector 302 has been detected a threshold number of times. For example, the vector LUT 340 may further store a count value associated with each face vector 302 stored in therein. Accordingly, the profile filter 330 may increment the count value for a particular face vector 302 each time a match is detected with the same face vector.

The user interface 350 is configured to display content 304 on the display 360 based on the profile information 303 associated with the face vector 302. In some aspects, the user interface 350 may provide an interface through which the user can operate or otherwise use the smart device 300. For example, the user interface 350 may display a list of media content available for viewing on the smart device 300. The user interface 350 may also process user inputs 305 corresponding to a selection of available media content for playback. For example, the user inputs 305 may be received via an input mechanism (not shown for simplicity) provided on, or coupled to, the smart device 300. In some implementations, the user interface 350 may include a content store 352 and a content retrieval module 354. The content store 352 may store or buffer media content for playback on the display 360 and/or a display device (not shown) coupled to the smart device 300. The content retrieval module 354 may retrieve media content from one or more content delivery networks (CDNs) external to the smart device 300. For example, the content store 352 may store or buffer the media content retrieved by the content retrieval module 354.

In some embodiments, the user interface 350 may implement the profile information 303 to provide a personalized user experience for the current user of the smart device 300. As described above, the profile information 303 may include configurations, settings, preferences, and/or content that may be used to create a personalized user experience. In some aspects, the profile information 303 may be determined based on the user's viewing history and/or self-reported interests or preferences. Thus, the user interface 350 may display recommended media content and/or targeted advertisements based on the profile information 303 (e.g., as described above with respect to FIG. 2).

In some other embodiments, the user interface 350 may update the profile information 303 or generate new profile information based on the received user inputs 305. For example, the user interface 350 may determine and/or infer the preferences of the user based on his or her viewing history and other interactions with the smart device 300. The profile filter 330 may then store the new or updated profile information 303, in the vector LUT 340, in association with the current face vector 302.

As shown in FIG. 3, the image 301, face vector 302, and profile information 303 are all generated and/or stored locally on the smart device 300. More specifically, none of the user's data 301-303 needs to be sent outside the smart device 300 in order to provide a personalized user experience. Moreover, the smart device 300 may capture the images 301, and thus retrieve the profile information 303 for a particular user, without requiring any explicit inputs and/or actions by the user (e.g., without a user enrollment process). Accordingly, the smart device 300 may display a personalized user interface 350 for a particular user in a manner that is transparent to the user while also preserving the user's privacy.

Although a media device has been described as a specific example of a smart device that can be personalized in accordance with the present embodiments, the embodiments described herein may also be used to provide a personalized user experience on various other devices. Example use cases may include, but are not limited to, customizing a coffee machine's configurations and adjusting a car's seat, air-conditioning, and/or music configurations for any given user. More generally, aspects of the present disclosure may be applicable to any device with a biometric sensor (such as a camera, microphone, fingerprint sensor, and the like) that is capable of adapting its user experience to a user of the device.

Figure 4:
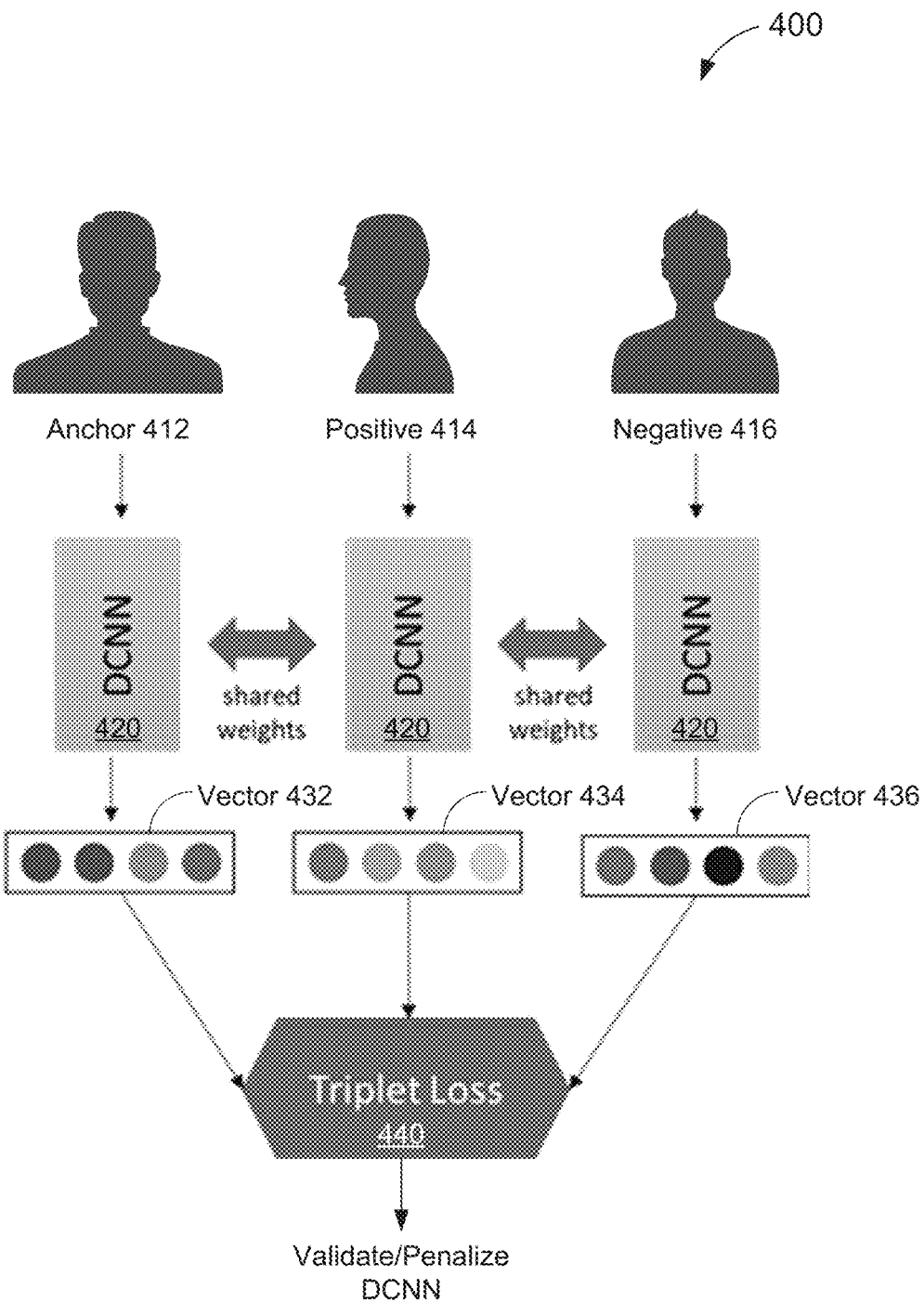
FIG. 4 is an illustrative diagram depicting an example process for training a neural network for offline use.

FIG. 4 is an illustrative diagram depicting an example process 400 for training a neural network for offline use. In some embodiments, the process 400 may be used to train a neural network model 420 that can be used to encode an image containing a face into a uniquely-identifiable vector (e.g., a face vector). Thus, the training process 400 may be implemented in a deep learning environment (such as the deep learning environment 101 of FIG. 1) with access to hundreds, if not thousands, of images containing human faces. For example, the faces may be presented with varying pose, lighting, makeup, and other real-world conditions.

The neural network model 420 may be any neural network architecture that receives an image as its input and generates an N-dimensional vector as its output. For example, as shown in FIG. 4, the neural network model 420 may be a deep convolutional neural network (DCNN). The weights of the neural network 420 may remain the same when processing each triplet of images 412-416. However, the individual weights may be initialized randomly.

Because the neural network model 420 is to be implemented in an offline manner on a smart device (e.g., with no further training or refinement once stored on the smart device), the neural network model 420 should be capable of generating a unique face vector from an image of any user's face. More specifically, the neural network model 420 should produce the same (or substantially similar) face vector for each image that contains the same user's face, regardless of pose, face position, or environment. Further, the face vector for a particular user should be substantially different than the face vector for any other user.

During the training process 400, the neural network model 420 may compare an anchor image 412 with a positive image 414 and a negative image 416. The anchor image 412 includes a face that forms the basis of the comparison, the positive image 414 includes a face of the same person in the anchor image 412 albeit with some real-world variations (e.g., different pose, position, or environment), and the negative image 416 includes a face of a different person. The neural network model 420 encodes each of the images 412, 414, and 416 to a respective N-dimensional vector 432, 434, and 436.

A triplet loss 440 is then computed for the resulting vectors 432-436. The triplet loss 440 is a function of the distance between the anchor vector 432 and positive vector 434 and the distance between the anchor vector 432 and negative vector 435. For example, the triplet loss function can be expressed as:

$$\text{Loss} = \sum_{i=1}^{N} [\|f_i^a - f_i^p\|_2^2 - \|f_i^a - f_i^n\|_2^2 + \alpha]_+$$

where $f^a$ represents the vector generated from the anchor image 412 (e.g., the anchor vector 432), $f^p$ represents the vector generated from the positive image 414 (e.g., the positive vector 434), $f^n$ represents the vector generated from the negative image 416 (e.g., the negative vector 436), N is the total number of data triplets 412-416, and $\alpha$ is the minimum separation margin between positive and negative samples that should be maintained to avoid penalizing the neural network model 420.

The training process 400 may be configured to reduce or minimize the triplet loss 440. Thus, the triplet loss 440 may be used to penalize the neural network model 420 if the distance between the anchor vector 432 and the positive vector 434 is too large (e.g., greater than a threshold distance) or the distance between the anchor vector 432 and the negative vector 436 is too small (e.g., less than a threshold distance). On the other hand, the triplet loss 440 may be used to validate the neural network model 420 if the distance between the anchor vector 432 and the positive vector 434 is sufficiently small (e.g., less than a threshold distance) and the distance between the anchor vector 432 and the negative vector 436 is sufficiently large (e.g., greater than a threshold distance).

The training process 400 may continue in an iterative manner until the triplet loss 440 converges (e.g., to a minimum amount). For example, in each iteration, the neural network model 420 may be provided with new batches of data triplets 412-416. When the triplet loss 440 reaches a minimum amount, the training process 400 may be terminated and the neural network model is ready to be implemented on a smart device. In some embodiments, the trained neural network model 420 may be quantized and converted to run on the smart device using a publicly available tool (such as TOCO).

Figure 5:
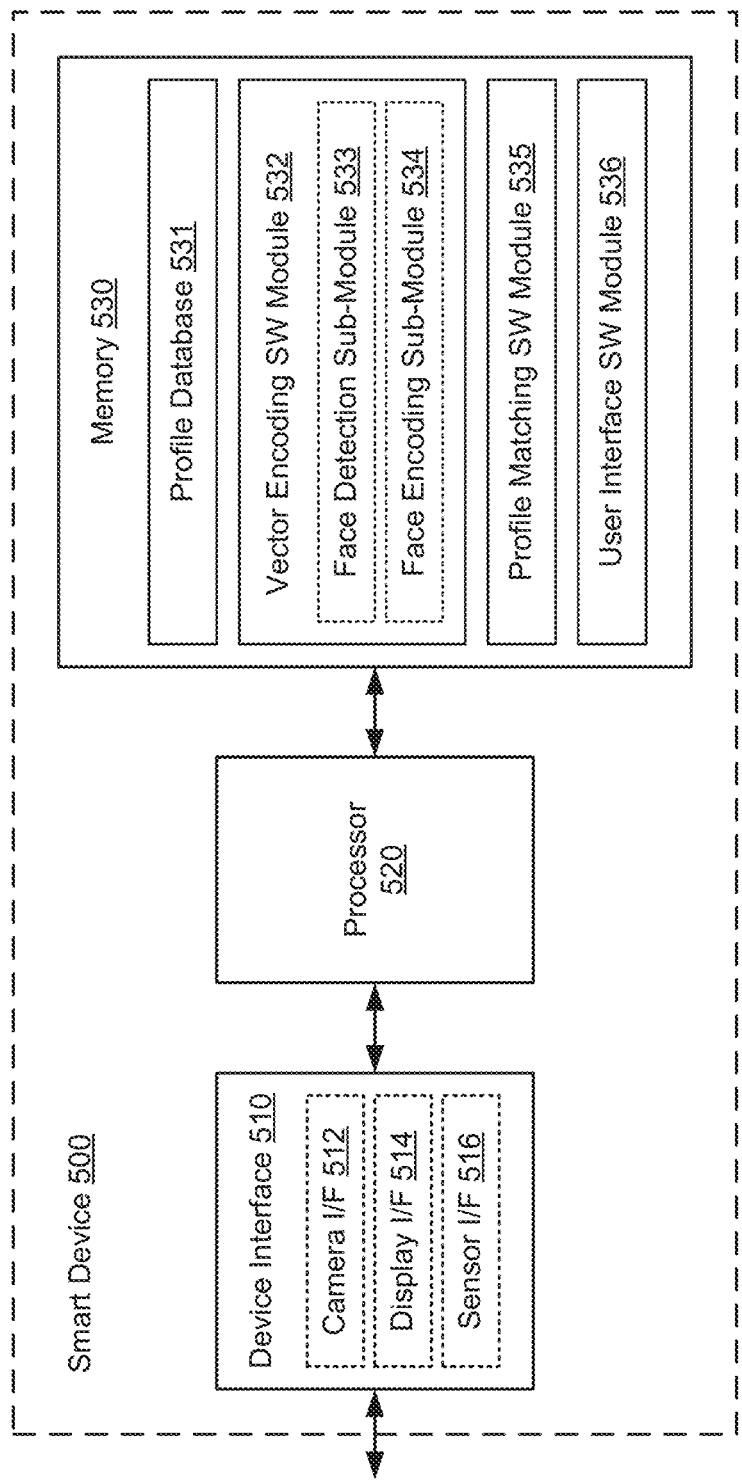
FIG. 5 shows another block diagram of a smart device, in accordance with some embodiments.

FIG. 5 shows a block diagram of a smart device 500, in accordance with some embodiments. The smart device 500 may be an embodiment of any of the smart devices 110, 210, or 300 described herein with respect to FIGS. 1-3. The smart device 500 includes a device interface 510, a processor 530, and a memory 530.

The device interface 510 may include a camera interface 512, a display interface 514, and a sensor interface 516. The camera interface 512 may be used to communicate with a camera of the smart device (such as the camera 212 of FIG. 2 and/or camera 310 of FIG. 3). For example, the camera interface 512 may transmit signals to, and receive signals from, the camera to capture an image of a scene facing the smart device. The display interface 514 may be used to communicate with a display of the smart device (such as the display 214 of FIG. 2 and/or display 360 of FIG. 3). For example, the display interface 514 may transit media content and/or user interface data to the display. The sensor interface 516 may also be used to communicate with one or more additional sensors of the smart device. For example, the sensor interface 516 may receive user inputs from the additional sensors.

The memory 530 may include a profile database 531 to store profile information for various users of the smart device. In some embodiments, the profile information for each user may be stored in association with a biometric identifier (e.g., face vector) for that user. The memory 530 may also include a non-transitory computer-readable medium (e.g., one or more nonvolatile memory elements, such as EPROM, EEPROM, Flash memory, a hard drive, etc.) that may store at least the following software (SW) modules:

a vector encoding SW module 532 to generate a biometric identifier or vector based at least in part on a captured image, the vector encoding SW module 532 further including:
   a face detection sub-module 533 to detect one or more human faces in the captured image; and
   a face encoding sub-module 534 to encode the captured image into a uniquely identifiable vector; and
a profile matching SW module 535 to retrieve profile information associated with the biometric identifier or vector from the profile database 531; and
a user interface SW module 536 to display, render, or otherwise manifest the profile information (or content associated with the profile information) on the smart device.

Each software module includes instructions that, when executed by the processor 520, cause the smart device 500 to perform the corresponding functions. The non-transitory computer-readable medium of memory 530 thus includes instructions for performing all or a portion of the operations described below with respect to FIGS. 6 and 7.

Processor 520 may be any suitable one or more processors capable of executing scripts or instructions of one or more software programs stored in the smart device 500. For example, the processor 520 may execute the vector encoding SW module 532 to generate a biometric identifier or vector based at least in part on a captured image. In executing the vector encoding SW module 532, the processor 520 may also execute the face detection sub-module 533 to detect one or more human faces in the captured image, and the face encoding sub-module 534 to encode the captured image into a uniquely identifiable vector. The processor 520 may also execute the profile matching SW module 535 to retrieve profile information associated with the biometric identifier or vector from the profile database 531. Still further, the processor 520 may execute the user interface SW module 536 to display, render, or otherwise manifest the profile information (or content associated with the profile information) on the smart device.

Figure 6:
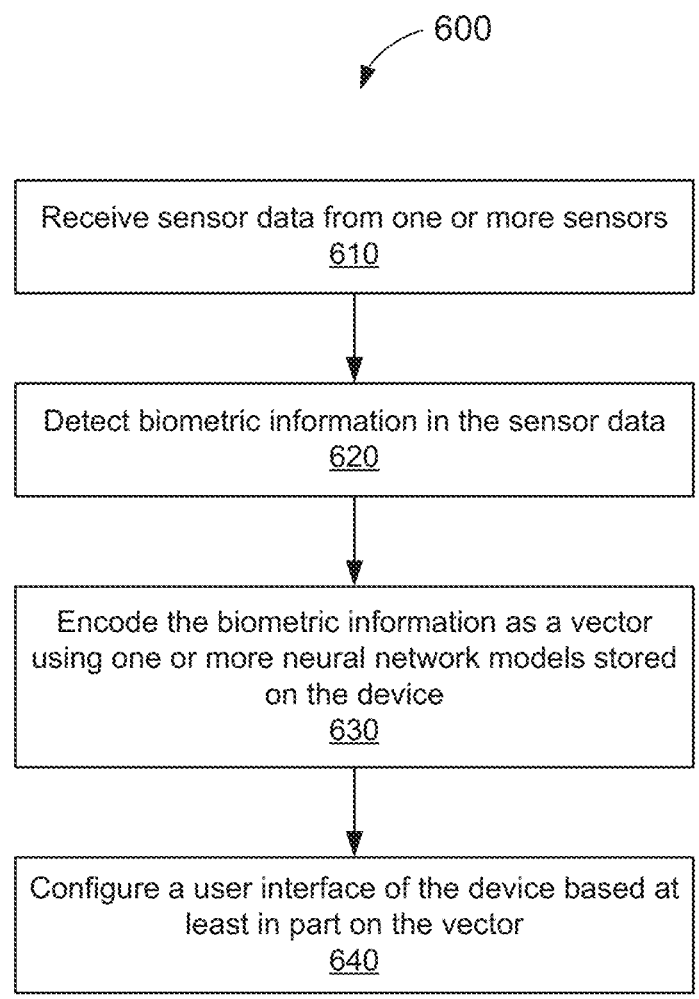
FIG. 6 is an illustrative flowchart depicting an example device personalization operation, in accordance with some embodiments.

FIG. 6 is an illustrative flowchart depicting an example device personalization operation 600, in accordance with some embodiments. With reference for example to FIG. 1, the example operation 600 may be performed by the smart device 110 to provide a personalized user experience to the user of the device.

The smart device may receive sensor data from one or more sensors (610). In some embodiments, the smart device may acquire the sensor data in a manner that is transparent to the user. For example, the smart device may operate its sensors to capture the sensor data while the user is operating the smart device for its intended use (e.g., viewing or listening to media content, making phone calls, sending or receiving messages, and the like).

The smart device may further detect biometric information in the sensor data (620). For example, the biometric information may include any uniquely identifiable biological characteristics of a particular user. Example biological characteristics include, but are not limited to, features of a user's face, voice, fingerprint, eyes, and the like.

The smart device may encode the biometric information as a vector using one or more neural network models stored on the device (630). For example, the neural network models may be trained to generate a unique biometric identifier (e.g., vector) based on sensor data containing the detected biometric information. In some embodiments, the neural network models may be trained in a deep learning environment with access to a large volume of training data and may be stored on the device prior to performing the operation 600. However, the encoding of the sensor data is performed locally on the smart device (e.g., without sending any of the sensor data to the deep learning environment or any other external device and/or network).

The smart device may then configure a user interface of the device based at least in part on the vector (640). For example, the smart device may match the vector to profile information stored in a profile database. The profile information may include configurations, settings, preferences, and/or content that can be used to personalize the smart device for a particular user. In some aspects, the user interface may display, render, or otherwise manifest the profile information on the smart device to provide a personalized user experience.

Figure 7:
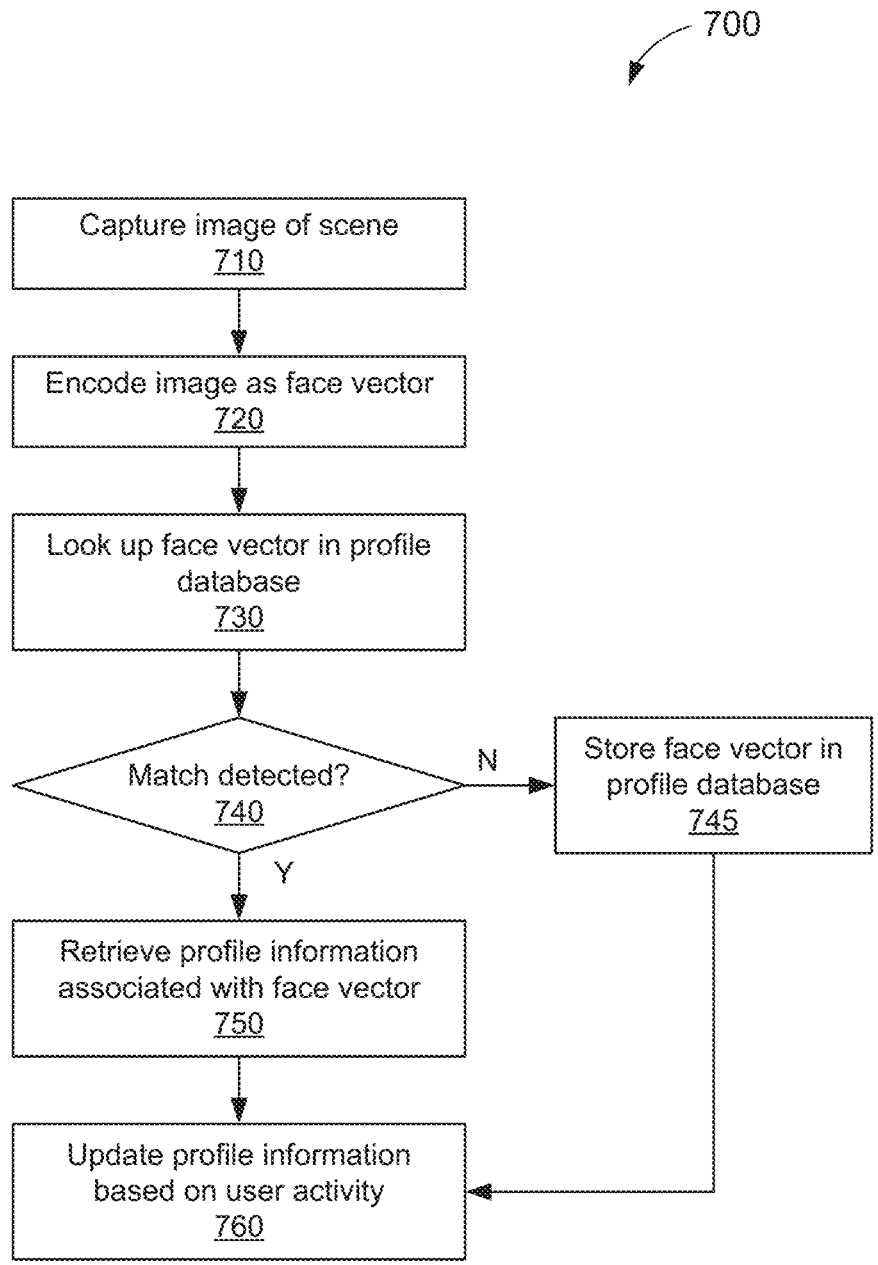
FIG. 7 is another illustrative flowchart depicting an example device personalization operation, in accordance with some embodiments.

FIG. 7 is another illustrative flowchart depicting an example device personalization operation 700, in accordance with some embodiments. With reference for example to FIG. 3, the example operation 700 may be performed by the smart device 300 to provide a personalized user experience for a user of the device.

The smart device first captures an image of a scene (710). For example, the smart device may operate a camera to capture an image of the environment surrounding the smart device (such as the scene 201 of FIG. 2).

The smart device may encode the image as a face vector (720). For example, the smart device may implement one or more neural network models to detect faces in the captured image and embed (e.g., map) the image into a unique face vector representing that face. The face vector may be an N-dimensional vector (e.g., where N is the number of dimensions needed to satisfy the requirements of such a uniquely identifiable vector).

The smart device may then look up the face vector in a profile database (730). For example, smart device may retrieve profile information associated with the face vector.

In some aspects, the smart device may compare the face vector to known face vectors stored in a vector LUT to look for a match (740). If no match is detected (as tested at 740), the smart device may store the face vector as a new entry in the vector LUT (745). The smart device may then proceed to record profile information in the new entry of the vector LUT based, at least in part, on user activity (760). For example, the smart device may determine and/or infer the preferences of the user based on his or her viewing history and other interactions with the smart device.

If a match is detected (as tested at 740), the smart device may retrieve the profile information associated with the matching face vector (750). In some embodiments, smart device may retrieve the profile information only after the matching face vector has been detected a threshold number of times. For example, the smart device may increment a count value for a particular face vector each time a match is detected with the same face vector. The smart device may further proceed to update the profile information associated with the matching face vector based, at least in part, on user activity (760).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of personalizing a device, comprising:
receiving first sensor data from one or more sensors;
detecting first biometric information of a user in the first sensor data;
encoding the first biometric information as a first vector using one or more neural network models stored on the device;
matching the first vector to a first entry of a plurality of entries stored in a lookup table, wherein the lookup table is configured to store profile information associated with each entry of the plurality of entries;
incrementing a count value indicating a number of instances the first vector has been matched to the first entry in the lookup table;
determining whether the count value exceeds a threshold number; and
configuring a user interface of the device based at least in part on the profile information associated with the first entry responsive to determining that the count value exceeds the threshold number.

2. The method of claim 1, wherein the matching comprises:
calculating respective distances from the first vector to each entry of the plurality of entries, including the first entry, stored in the lookup table; and
determining that the distance to the first entry is the shortest among the calculated distances.

3. The method of claim 1, wherein the profile information for each entry of the plurality of entries includes configurations, settings, preferences, or content to be displayed or rendered via the user interface.

4. The method of claim 1, further comprising:
monitoring user interactions with the device; and
generating the profile information for each entry of the plurality of entries based at least in part on the user interactions.

5. The method of claim 1, further comprising:
storing the first vector as a new entry in the lookup table when no matching entry is detected.

6. The method of claim 1, wherein the first sensor data comprises an image of a scene and the first biometric information comprises one or more facial features of the user in the scene.

7. The method of claim 1, further comprising:
receiving second sensor data from the one or more sensors;
detecting second biometric information in the second sensor data;
encoding the second biometric information of the second sensor data as a second vector using the one or more neural network models, wherein the second vector is at least a threshold distance away from the first vector; and
changing the user interface based at least in part on the second vector.

8. A device, comprising:
processing circuitry; and
memory storing instructions that, when executed by the processing circuitry, cause the device to:
receive first sensor data from one or more sensors;
detect first biometric information of a user in the first sensor data;
encode the first biometric information as a first vector using one or more neural network models stored on the device;
match the first vector to a first entry of a plurality of entries stored in a lookup table, wherein the lookup table is configured to store profile information associated with each entry of the plurality of entries;
increment a count value indicating a number of instances the first vector has been matched to the first entry in the lookup table;
determine whether the count value exceeds a threshold number; and
configure a user interface of the device based at least in part on the
profile information associated with the first entry responsive to determining that the count value exceeds the threshold number.

9. The device of claim 8, wherein execution of the instructions for matching the first vector to the first entry causes the device to:
calculate respective distances from the first vector to each entry of the plurality of entries, including the first entry, stored in the lookup table; and
determining that the distance to the first entry is the shortest among the calculated distances.

10. The device of claim 8, wherein execution of the instructions further causes the device to:
monitor user interactions with the device; and
generate the profile information for each entry of the plurality of entries based at least in part on the user interactions, wherein the profile information for each entry of the plurality of entries includes configurations, settings, preferences, or content to be displayed or rendered via the user interface.

11. The device of claim 8, wherein execution of the instructions further causes the device to:
store the first vector as a new entry in the lookup table when no matching entry is detected.

12. The device of claim 8, wherein the first sensor data comprises an image of a scene and the first biometric information comprises one or more facial features of the user in the scene.

13. The device of claim 8, wherein execution of the instructions further causes the device to:
receive second sensor data from the one or more sensors;
detect second biometric information in the second sensor data;
encode the second biometric information of the second sensor data as a second vector using the one or more neural network models, wherein the second vector is at least a threshold distance away from the first vector; and
change the user interface based at least in part on the second vector.

14. A system comprising:
a memory storing one or more neural network models;
one or more sensors configured to capture at least first sensor data;
a vector generator configured to:
detect first biometric information of a user in the captured first sensor data; and
encode the first biometric information as a first vector using the one or more neural network models stored in the memory;
a profile filter configured to:
match the first vector to a first entry of a plurality of entries stored in a lookup table, wherein the lookup table is configured to store profile information associated with each entry of the plurality of entries;

increment a count value indicating a number of instances the first vector has been matched to the first entry in the lookup table; and determine whether the count value exceeds a threshold number; and a display configured to display a user interface based at least in part on the profile information associated with the first entry responsive to determining that the count value exceeds the threshold number.

\* \* \* \* \*